United States Patent
Karpyuk et al.

(10) Patent No.: US 12,482,575 B2
(45) Date of Patent: Nov. 25, 2025

(54) METHOD OF MANUFACTURING A NUCLEAR FUEL ELEMENT END PLUG WHICH CONTAINS ß-SiC, Al2O3, AND Y2O3

(71) Applicant: BOCHVAR HIGH-TECHNOLOGY RESEARCH INSTITUTE FOR INORGANIC MATERIALS, Moscow (RU)

(72) Inventors: Leonid Aleksandrovich Karpyuk, Moscow (RU); Vladislav Konstantinovich Orlov, Moscow (RU); Sergey Igorevich Ivanov, Moscow (RU); Alexey Vladimirovich Glebov, Moscow (RU); Fyodor Viktorovich Makarov, Krasnogorsk District (RU); Roman Gennadyevich Zakharov, Moscow (RU); Ivan Alexandrovich Dzyubinsky, Moscow (RU); Alexander Pavlovich Ponomarenko, Moscow (RU); Dmitry Vladimirovich Kuznetsov, Moscow (RU)

(73) Assignee: BOCHVAR HIGH-TECHNOLOGY RESEARCH INSTITUTE FOR INORGANIC MATERIALS, Moscow (RU)

( * ) Notice: Subject to any disclaimer, the term of this patent is extended or adjusted under 35 U.S.C. 154(b) by 637 days.

(21) Appl. No.: 17/620,731

(22) PCT Filed: Dec. 29, 2020

(86) PCT No.: PCT/RU2020/000771
§ 371 (c)(1),
(2) Date: Dec. 19, 2021

(87) PCT Pub. No.: WO2022/103296
PCT Pub. Date: May 19, 2022

(65) Prior Publication Data
US 2022/0415526 A1     Dec. 29, 2022

(30) Foreign Application Priority Data

Nov. 10, 2020   (RU) ................................. 2020136805

(51) Int. Cl.
| | | |
|---|---|---|
| *G21C 21/00* | (2006.01) | |
| *G21C 3/10* | (2006.01) | |
| *G21C 3/07* | (2006.01) | |

(52) U.S. Cl.
CPC ............... *G21C 21/00* (2013.01); *G21C 3/10* (2013.01); *G21C 3/07* (2013.01)

(58) Field of Classification Search
CPC ............. G21C 21/00; G21C 3/10; G21C 3/07
(Continued)

(56) References Cited

U.S. PATENT DOCUMENTS

| 5,354,398 A | 10/1994 | Kawai |
| 11,976,354 B2 * | 5/2024 | Karpyuk .................. G21C 3/10 |

(Continued)

FOREIGN PATENT DOCUMENTS

| EP | 3226247 | 10/2017 |
| GB | 2553090 | 2/2018 |

(Continued)

*Primary Examiner* — Jack W Keith
*Assistant Examiner* — Daniel Wasil
(74) *Attorney, Agent, or Firm* — Craft Chu PLLC; Andrew W. Chu

(57) ABSTRACT

Method of manufacturing an end plug for a nuclear fuel element. The end plug includes at least two coaxial cylinders having different diameters. The end plug is configured to seal a ceramic cladding tube. The manufacturing method includes hot pressing a powder mixture comprising β-SiC, $Al_2O_3$, AND $Y_2O_3$.

8 Claims, 12 Drawing Sheets

(58) Field of Classification Search
USPC .................................................. 376/261, 451
See application file for complete search history.

(56) References Cited

U.S. PATENT DOCUMENTS

| | | |
|---|---|---|
| 2009/0032178 A1 | 2/2009 | Feinroth |
| 2016/0358673 A1 | 12/2016 | Xu et al. |
| 2017/0301414 A1* | 10/2017 | Ishibashi .................. G21C 3/10 |
| 2017/0372802 A1 | 12/2017 | Byers et al. |

FOREIGN PATENT DOCUMENTS

| | | |
|---|---|---|
| JP | 2012233734 | 11/2012 |
| JP | 2017072430 A | 4/2017 |
| RU | 2481654 | 5/2013 |

* cited by examiner

METHOD OF MANUFACTURING A NUCLEAR FUEL ELEMENT END PLUG WHICH CONTAINS ß-SiC, Al2O3, AND Y2O3

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to the field of nuclear power engineering and may be used for manufacturing end plugs based on silicon carbide and intended for sealing composite tubular ceramic claddings of fuel elements.

2. Description of Related Art Including Information Disclosed Under 37 CFR 1.97 and 37 CFR 1.98

The operating reliability of fuel elements is mostly determined by quality of bonding provided between the cladding and the end plugs.

Said bonding should be hermetically sealed when the inner volume of a fuel element is filled with an inert gas at a pressure of up to 2.53 MPa. Various methods are used for creating such pressure and sealing a fuel element after filling it with gas.

The filling of the inner volume with gas and the sealing of a fuel element manufactured from zirconium alloys for water-moderated water-cooled reactors (WWPRs) are performed in a single cycle in a butt welder. A process flow and a plug shape are presented in the book "Development, manufacture and operation of power reactor fuel elements", ed. by Reshetnikov F. G., Book 2, Energoizdat, 1995.

Also, a fuel element for nuclear WWPRs and a method for manufacturing same are known in the art (see: patent RU 2481654, IPC G21C 3/00, publ. Oct. 5, 2013). This invention relates to nuclear power engineering and may be used for manufacturing fuel elements primarily for nuclear WWPRs. A tube of the fuel element cladding is made of alternating layers of nanocrystalline silicon carbide and separating layers of a high-temperature material that does not structurally match silicon carbide; and the plugs on both ends of the tube are made of silicon carbide preventing gases from passing through the end plugs. The method for manufacturing this fuel element is based on heating a graphite rod to a temperature ranging from 1300° C. to 1600° C. in a gas mixture corresponding to the tube layer material and on alternate replacement of this mixture for forming a next layer of the tube. In order to form a layer of nanocrystalline silicon carbide, a gas mixture is used that comprises Si and C hydrates and chlorides.

Disadvantages of the Known Device are:
1) environmental risks due to formation of ecologically hazardous gaseous hydrogen chloride, since a gas mixture comprising chlorine and hydrogen is used in this method for forming a layer of nanocrystalline silicon carbide;
2) the patent specification lacks comprehensive data on the material used for forming the plugs and on the composition of the plugs produced by this method.

Nuclear reactor fuel rods and a fuel assembly are known in the art (Patent EP 3226247, IPC G21C 3/10, G21C 3/06; publ. Apr. 10, 2017); an object of the invention is to provide a nuclear reactor fuel rod in which a SiC material is used as materials of a fuel cladding tube and an end plug. Air tightness, heat resistance, and corrosion resistance are provided at a bonding portion between the fuel cladding tube and the end plug. The nuclear reactor fuel rods are bundled into a fuel assembly. According to the invention, a nuclear reactor fuel rod is a fuel rod for a light-water reactor. The nuclear reactor fuel rod includes a fuel cladding tube and an end plug, both of which are formed of a silicon carbide material. A bonding portion between the fuel cladding tube and the end plug is formed by brazing with a predetermined metal bonding material interposed, and/or by diffusion bonding. The predetermined metal bonding material has a solidus temperature of 1200° C. or higher. An outer surface of the bonding portion, and a portion of an outer surface of the fuel cladding tube and the end plug, which is adjacent to the outer surface of the bonding portion, are covered by bonding-portion coating formed from a predetermined coating metal.

A disadvantage of this device consists in that a method for manufacturing the plugs as well as a material from which the plugs are manufactured are not disclosed; therefore, it is not possible to evaluate a manufacturability level and mechanical and thermophysical properties of the end plugs produced by this method.

A method for manufacturing a SiC element for a nuclear fuel rod is known in the art (Patent GB 2553090, IPC G21C 3/07, G21C 3/10, G21C 21/02; publ. 28 Feb. 2018). This method for manufacturing a SiC element for a nuclear fuel rod may comprise production of a SiC tube and a SiC sealing arrangement (plug) for one or both ends of the tube. The sealing arrangement may provide a gastight sealing between said element over the end plug (in the shape of a cap) and a joint intermediary material, such as a titanium foil or a silicon carbide slurry. The sealing method may comprise applying electrical current and pressure, e.g. use the spark plasma sintering (SPS) or field assisted sintering technique (FAST). The plug may have a conical or conical frustum shape, and the element over the end plug may be made as two semi-cylindrical portions. The tube may rotate during the joining process.

Disadvantages of this device are:
1) the proposed structure of the end plug does not correspond to the existing structure of typical plugs used for sealing tubes (claddings) of fuel rods used in the WWPR type reactors. Therefore, the use of this type of end plugs as an alternative to the existing plugs is not possible, since their use may result in disturbance of coolant flows as well as may affect heat transfer properties of fuel elements and fuel assemblies;

2) this patent does not provide a method for manufacturing plugs as well as a material the plugs are made of: therefore, it is impossible to evaluate a manufacturability level and mechanical and thermophysical properties of end plugs produced by this method.

A nuclear fuel rod is known in the art (US patent application 2017372802, IPC G21C 3/10, G21C 3/07; publ. 28 Dec. 2017). A gland seal end plug closure fora nuclear fuel rod cladding is composed of silicon carbide or other materials that cannot be welded. The sealant is made, preferably, from one or more forms of pure graphite and the ram, seat and other components of the gland seal end plug are formed from high temperature metallic or ceramic materials.

Disadvantages of this device are:

1) the proposed structure of the end plug does not correspond to the existing structures of typical plugs for sealing tubes of fuel elements used in reactors of the WWPR type. Therefore, the use of end plugs of this type is impossible as an alternative to the existing plugs, since their use may result in disturbance of coolant flows as well as may affect heat transfer properties of fuel elements and fuel assemblies;

2) the proposed structure of the end plug is technically complex, which may result in appearance of defects in fuel tubes with fuel loaded, since the procedure of sealing with the end plug is performed at the final stage of assembling fuel elements.

The closest analog, which is taken as the prototype, is a fuel assembly and a method for manufacturing it (Patent JP 2012-233734, IPC G21C 21/02, publ. 29 Nov. 2012). The prototype is aimed at providing fuel tube cladding assembly having corrosion resistance, radiation resistance, bonding strength, etc. in a reactor at an elevated temperature and pressure. The patent proposes end plugs made of a composite material reinforced with silicon carbide fiber.

Disadvantages of this device are: technical complexity, multistage fabrication and a great number of components having various configurations.

BRIEF SUMMARY OF THE INVENTION

The technical object of the present invention is to develop a construction of a SiC-based end plug for sealing of a fuel element made of a silicon carbide-based composite, and a method for manufacturing same.

The technical effects of the invention are:
safety for the environment,
possibility of using the developed end plugs as an alternative for replacing plugs used in various reactors,
simplification of methods for manufacturing end plugs,
improvements in mechanical and thermophysical properties of end plugs.

BRIEF DESCRIPTION OF THE SEVERAL VIEWS OF THE DRAWINGS

The invention is illustrated with the following graphic materials.

DETAILED DESCRIPTION OF THE INVENTION

Figure 1:
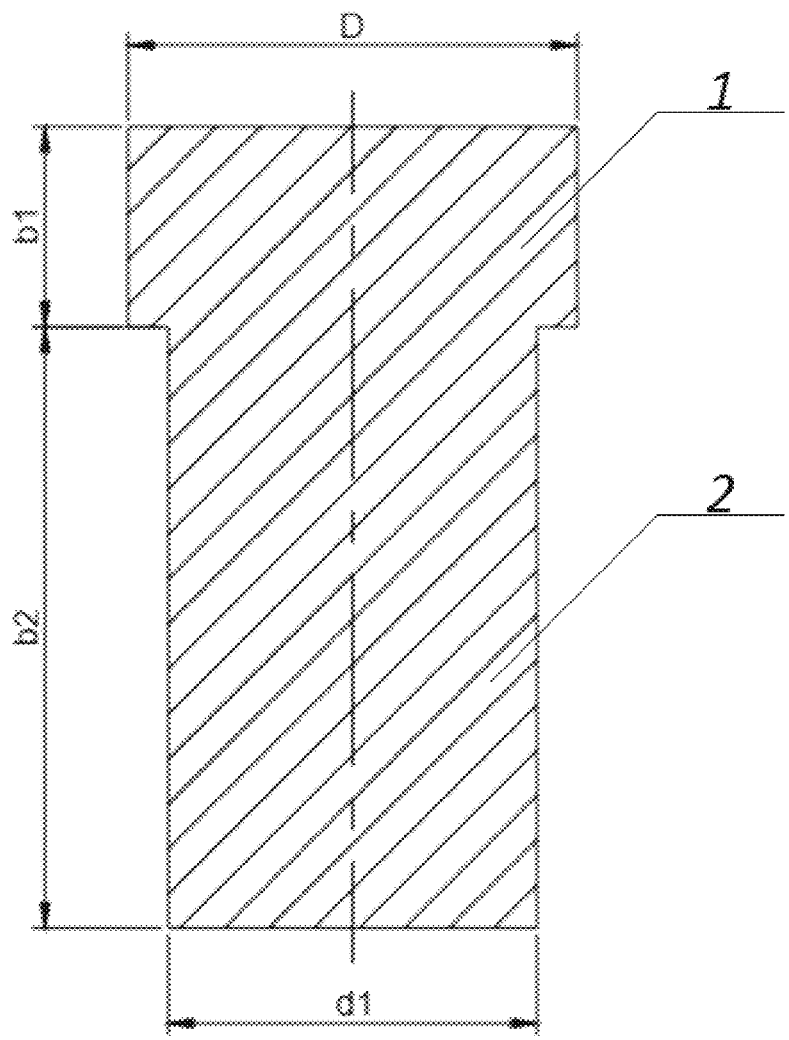
FIG. 1 shows a longitudinal sectional view of the structure of the end plug according to the first variant, where: 1—the first part of the end plug; 2—the second part of the end plug.

The essence of the proposed invention is that an end plug for sealing a composite tubular ceramic cladding of a fuel element of a nuclear reactor according to the first variant is made on the basis of β-SiC and consists of two parts in the form of two coaxial cylinders of different diameters. A first part of the end plug is located outside the cladding and is made as a tail part configured to be installed (fitted) to an end of said cladding and fixed thereon for forming a collar—necessary ledge on the supporting portion. A second part of the end plug is configured for being arranged inside the cladding. The cladding end is made straight.

The diameter of the first part of the end plug is equal to the outer diameter of the cladding. The diameter of the second part of the end plug is 0.06-0.08 mm less than the inner diameter of the cladding in order a paste-like braze may be interposed into a clearance therebetween. Said paste-like braze is applied before assembling for brazing, and said capillary clearance is required for brazing the end plug and the SiC cladding.

An end plug for sealing composite tubular ceramic cladding of a fuel element of a nuclear reactor according to the second variant is made on the basis of β-SiC and consists of two parts in the form of two coaxial cylinders of different diameters. A first part of the end plug is located outside the cladding and is made as a tail part configured to be installed (fitted) to an end of said cladding and fixed thereon for forming a collar—necessary ledge on the supporting portion. A second part of the end plug is configured for being arranged inside the cladding. The cladding end is made straight.

The diameter of the first part of the end plug is equal to the outer diameter of the cladding. The diameter of the second part of the end plug is 2-3 mm less than the inner diameter of the cladding in order a foil braze may be interposed into a clearance therebetween. Said foil braze is arranged before assembling for brazing, and said capillary clearance is required for brazing the end plug and the SiC cladding.

An end plug for sealing composite tubular ceramic cladding of a fuel element of a nuclear reactor according to the third variant is made on the basis of β-SiC and consists of three parts in the form of three successive cylinders of different diameters arranged coaxially. A first part of the end plug is located outside the cladding and is made as a tail part configured to be installed (fitted) to an end of said cladding and fixed thereon for forming a collar—necessary ledge on the supporting portion. A second part and a third part of the end plug are configured for being arranged inside the cladding, and a braze can be interposed into the clearances between them and the cladding, the third part of the end plug being made in the form of a groove or slot for interposing additional braze. The cladding end is made straight.

The diameter of the first part of the end plug is equal to the outer diameter of the cladding. The diameter of the second part of the end plug is 0.06-0.08 mm less than the inner diameter of the cladding in order a paste-like braze may be interposed. The diameter of the third part of the end plug is 2-3 mm less than the inner diameter of the cladding in order a foil braze may be additionally interposed.

Thus, the third variant of making the end plug has two zones for arranging two braze types—in the form of a paste and in the form of a foil—simultaneously. The paste-like braze and the foil braze are arranged before assembling for brazing.

The method for manufacturing an end plug for sealing a composite tubular ceramic cladding of a fuel element of a nuclear reactor comprises, according to the first variant: preparing a powder mixture based on silicon carbide, hot pressing of the powder mixture, sintering for producing an end plug of a predefined shape, and ejecting the finished end plug.

The powder mixture is prepared from β-SiC powder, $Al_2O_3$ powder and $Y_2O_3$ powder. To do this, the β-SiC powder is comminuted for producing 0.95 and 5.19 micron particles; then the $Al_2O_3$ powder with particles of 1.52 microns and the $Y_2O_3$ powder with particles of 1.01 microns are added. The content of the substances, in wt %, is the following: β-SiC with particles of 0.95 microns—10.59, β-SiC with particles of 5.19 microns—77.91, $Al_2O_3$ with particles of 1.52 microns—10.0, $Y_2O_3$ with particles of 1.01 microns—the rest.

The composition of this powder mixture was selected on the basis of an $Al_2O_3$—$Y_2O_3$ system state diagram.

After the powder mixture is prepared, a planetary ball mill may be used for mixing the powders uniformly.

The powder mixture is hot pressed with the use of special tools—upper and lower punches and a mold with cells whose shape and dimensions correspond to the end plug of any one of the three above variants of making end plugs. A parallelepiped-shaped mold having equal through cylindrical cells of the required shape and cylindrically shaped upper and lower punches are used. The lower punches are arranged on the lower side of the mold under each cell, the upper punches are arranged on the upper side of the mold above each cell with the possibility of moving them into the mold cell cavities.

Before hot pressing, the mold and the punches may be annealed in a vacuum compression furnace. A possible variant of annealing may consist in the following actions: the mold and the punches are heated in a vacuum compression furnace to the temperature of 200 degrees C., annealed for 60 minutes, cooled to the room temperature at a rate of not more than 50 degrees C./hour, held at the room temperature for at least 12 hours, pressure being maintained in the chamber of the vacuum compression furnace at a level of not more than 1 Pa.

In order to perform hot pressing, the powder mixture is loaded into the mold cell internal cavities onto the lower punches, the upper punches are placed into the mold cells over the powder mixture; then the powder mixture is held without heating at the pressure of 1 Pa for more than 12 h, pressed in the mold cells with the use of the upper punches, and sintering is conducted at the temperature of 1850 degrees C. in an inert gas atmosphere or in vacuum at the pressure of 0.1 MPa, with a pressing force of 22-25 MPa per one end plug. The sintering mode is maintained for 120 minutes. Finished end plugs are ejected out of each mold cell.

While developing the method, SiC particles with average size of 5.19 microns ($r_n$=2.595 microns) were taken as the primary fraction for preparing powder. In order to calculate a quantity of powder for the secondary, tertiary and quaternary fractions, data shown in Table 1 were used.

TABLE 1

Calculated data on filling gaps between pellets of a radius with pellets of smaller sizes.

| Parameters | Pellet name | | | | | |
| --- | --- | --- | --- | --- | --- | --- |
| | Primary | Secondary | Tertiary | Quaternary | Quinary | Filler |
| Pellet radius | a (2.595) | 0.414a (1.074) | 0.225a (0.584) | 0.175a (0.454) | 0.117a (0.0304) | Very small |
| Pellet relative quantity | 1 | 1 | 2 | 8 | 8 | |
| Pellet volume | $4.189a^3$ | $0.289a^3$ | $0.047a^3$ | $0.0225a^3$ | $0.0066a^3$ | |
| Volume of all pellets added | $4.189a^3$ | $0.289a^3$ | $0.0952a^3$ | $0.180a^3$ | $0.0526a^3$ | $0.622a^3$ |
| Total volume of pellets in mixture | $4.189a^3$ | $4.587a^3$ | $4.582a^3$ | $4.762a^3$ | $4.815a^3$ | $5.437a^3$ |

TABLE 1-continued

Calculated data on filling gaps between pellets of a radius with pellets of smaller sizes.

| Parameters | Pellet name | | | | | |
|---|---|---|---|---|---|---|
| | Primary | Secondary | Tertiary | Quaternary | Quinary | Filler |
| Mixture porosity, % | 25.95 | 20.7 | 19.0 | 15.8 | 14.9 | 3.9 |
| Relative quantity of given pellets, wt % | 77.1 | 5.5 | 1.7 | 3.3 | 1.0 | 11.4 |
| Relative weight of pellets in mixture | A | 0.071A | 0.022A | 0.043A | 0.013A | 0.148A |
| Pellet surface | $12.566a^2$ | $2.166a^2$ | $0.636a^2$ | $0.384a^2$ | $0.172a^2$ | |
| Surface of all pellets added | $12.566a^2$ | $2.166a^2$ | $1.272a^2$ | $3.076a^2$ | $1.37a^2$ | |
| Total surface of pellets in mixture | $12.566a^2$ | $14.732a^2$ | $16.004a^2$ | $19.080a^2$ | $20.456a^2$ | |

Further, when developing a method for selecting a composition of the powder mixture, a quantity of the secondary fraction of the comminuted SiC, v, $Y_2O_3$ was calculated with relation to the initial silicon carbide. The radii of the comminuted powders, as shown in Table 1, correspond to values of the secondary, tertiary and quaternary fractions. Taking into account that the relative quantity of the primary fraction of the initial SiC is 77.91 wt %, the composition of the powder mixture according to the first variant will be as shown in Table 2.

TABLE 2

Composition of powder mixture according to the first variant.

| Powder type | Quantity, wt % | Fraction size, microns |
|---|---|---|
| Composition of powder mixture 1 | | |
| Initial SiC | 77.91 | 5.19 |
| SiC | 10.59 | 0.95 |
| $Al_2O_3$ | 10.0 | 1.52 |
| $Y_2O_3$ | 1.5 | 1.01 |

The method for manufacturing an end plug for sealing a composite tubular ceramic cladding of a fuel element of a nuclear reactor comprises, according to the second variant: preparing a powder mixture based on silicon carbide, hot pressing of the powder mixture, sintering for producing an end plug of a predefined shape, and ejecting the finished end plug.

The powder mixture is prepared from β-SiC powder, $Al_2O_3$ powder and $Y_2O_3$ powder. To do this, the β-SiC powder is comminuted for producing 0.95 and 5.19 micron particles; then the $Al_2O_3$ powder with particles of 1.52 microns and the $Y_2O_3$ powder with particles of 1.01 microns are added. The substance content, in wt %, is the following: β-SiC with particles of 0.95 microns—10.78, β-SiC with particles of 5.19 microns—79.22, $Al_2O_3$ with particles of 1.52 microns—6.0, $Y_2O_3$ with particles of 1.01 microns—the rest.

The composition of this powder mixture was selected on the basis of an $Al_2O_3$—$Y_2O_3$ system state diagram.

After the powder mixture is prepared, a planetary ball mill may be used for mixing the powders uniformly.

The powder mixture is hot pressed with the use of special tools—upper and lower punches and a mold with cells whose shape and dimensions correspond to the end plug of any one of the three above variants of making end plugs. A parallelepiped-shaped mold having equal through cylindrical cells of the required shape and cylindrically shaped upper and lower punches are used. The lower punches are arranged on the lower side of the mold under each cell, the upper punches are arranged on the upper side of the mold above each cell with the possibility of moving them into the mold cell cavities.

Before hot pressing, the mold and the punches may be annealed in a vacuum compression furnace. A possible variant of annealing may consist in the following actions: the mold and the punches are heated in a vacuum compression furnace to the temperature of 200 degrees C., annealed for 60 minutes, cooled to the room temperature at a rate of not more than 50 degrees C./hour, held at the room temperature for at least 12 hours, pressure being maintained in the chamber of the vacuum compression furnace at a level not more than 1 Pa.

In order to perform hot pressing, the powder mixture is loaded into the mold cell internal cavities onto the lower punches, the upper punches are placed into the mold cells over the powder mixture; then the powder mixture is held without heating at the pressure of 1 Pa for more than 12 h, pressed in the mold cells with the use of the upper punches, and sintering is conducted at the temperature of 1850 degrees C. in an inert gas atmosphere or in vacuum at the pressure of 0.1 MPa, with a pressing force of 22-25 MPa per one end plug. The sintering mode is maintained for 120 minutes. Finished end plugs are ejected out of each mold cell.

While developing the method, SiC particles with average size of 5.19 microns ($r_n$=2.595 microns) were taken as the primary fraction for preparing powders. In order to calculate a quantity of powder for the secondary, tertiary and quaternary fractions, data shown in Table 1, above, were used.

Further, when developing a method for selecting a powder mixture composition, a quantity of the secondary fraction of the comminuted SiC, $Al_2O_3$, $Y_2O_3$ was calculated with relation to the initial silicon carbide. The radii of the comminuted powders, as shown in Table 1, correspond to values of the secondary, tertiary and quaternary fractions. Taking into account that the relative quantity of the primary fraction of the initial SiC is 79.22 wt %, the powder mixture composition according to the first variant will be as shown in Table 3.

TABLE 3

Composition of powder mixture according to the second variant.

| Powder type | Quantity, wt % | Fraction size, microns |
|---|---|---|
| Composition of powder mixture 1 | | |
| Initial SiC | 79.22 | 5.19 |
| SiC | 10.78 | 0.95 |
| $Al_2O_3$ | 6.0 | 1.52 |
| $Y_2O_3$ | 4.0 | 1.01 |

Below, exemplary embodiments are described.

Figure 4:
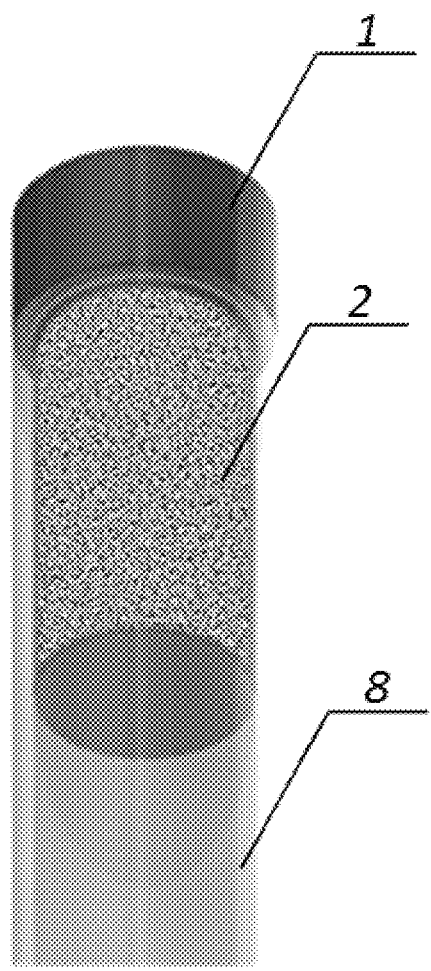
FIG. 4 shows a general perspective view of the tube of the fuel element with the end plug according to the first variant, where: 1—the first part of the end plug; 2—the second part of the end plug; 8—the fuel element cladding.

Example 1—An End Plug for Sealing a Composite Tubular Ceramic Cladding of a Fuel Element of a Nuclear Reactor According to the First Variant The end plug intended for being bonded with the fuel element cladding 8 is produced on the basis of β-SiC and is composed of two parts in the form of two coaxial cylinders having different diameters—a first part 1 and a second part 2; see FIGS. 1 and 4. For illustrative purposes, the fuel element cladding in FIG. 4 is conventionally represented transparent.

The second part 2 of the end plug is configured to be arranged inside the fuel element cladding 8; the first part 1, i.e. a collar in the form of a cylinder having a greater diameter—tail portion, is configured to be arranged outside the fuel element cladding 8.

The inner diameter of the fuel element cladding 8 is 7.72 mm, the outer diameter is 9.1 mm. The height of the second part of the end plug in the bonding area is b2=10 mm, the length of the first part 1 of the end plug is b1=7 mm. The diameter d1 of the second part 2 of the end plug is made 0.06 mm less than the inner diameter of the fuel element cladding for the purpose of interposing a braze in the form of a paste and is equal to 7.66 mm, and the diameter D of the first part 1 of the end plug is equal to the outer diameter of the fuel element cladding—9.1 mm.

The diameter d1 of the second part 2 of the end plug, that is less than the inner diameter of the fuel element cladding by 0.06 mm, is determined by a thickness of the paste-like braze layer which should be applied before assembling for brazing.

The paste-like braze is applied before assembling for brazing, this capillary clearance is required for brazing the end plug and the cladding based on silicon carbide. FIG. 4 shows a general view of the fuel element cladding 8 with the end plug composed of the first part 1 and the second part 2, the surface of the second part 2 of the end plug being the place for applying the paste-like braze.

This type of the end plug is manufactured in a size suitable for use in a WWPR reactor.

Example 2—An End Plug for Sealing a Composite Tubular Ceramic Cladding of a Fuel Element of a Nuclear Reactor According to the First Variant The end plug intended for being bonded with the fuel element cladding 8 is produced on the basis of β-SiC and is composed of two parts in the form of two coaxial cylinders having different diameters—a first part 1 and a second part 2; see FIGS. 1 and 4. For illustrative purposes, the fuel element cladding in FIG. 4 is conventionally represented transparent.

The second part 2 of the end plug is configured to be arranged inside the fuel element cladding 8; the first part 1, i.e. a collar in the form of a cylinder having a greater diameter—tail portion, is configured to be arranged outside the fuel element cladding 8.

The inner diameter of the fuel element cladding 8 is 9.31 mm, the outer diameter is 10.75 mm. The height of the second part of the end plug in the bonding area is b2=10 mm, the length of the first part 1 of the end plug is b1=5 mm. The diameter d1 of the second part 2 of the end plug is made 0.08 mm less than the inner diameter of the fuel element cladding for the purpose of interposing a braze in the form of a paste and is equal to 9.23 mm, and the diameter D of the first part 1 of the end plug is equal to the outer diameter of the fuel element cladding-10.75 mm.

The diameter d1 of the second part 2 of the end plug, that is less than the inner diameter of the fuel element cladding by 0.08 mm, is determined by a thickness of the paste-like braze layer which should be applied before assembling for brazing.

The paste-like braze is applied before assembling for brazing, this capillary clearance is required for brazing the end plug and the cladding based on silicon carbide. FIG. 4 shows a general view of the fuel element cladding 8 with the end plug composed of the first part 1 and the second part 2, the surface of the second part 2 of the end plug being the place for applying the paste-like braze.

This type of the end plug is manufactured in a size suitable for use in a PWR reactor.

Figure 2:
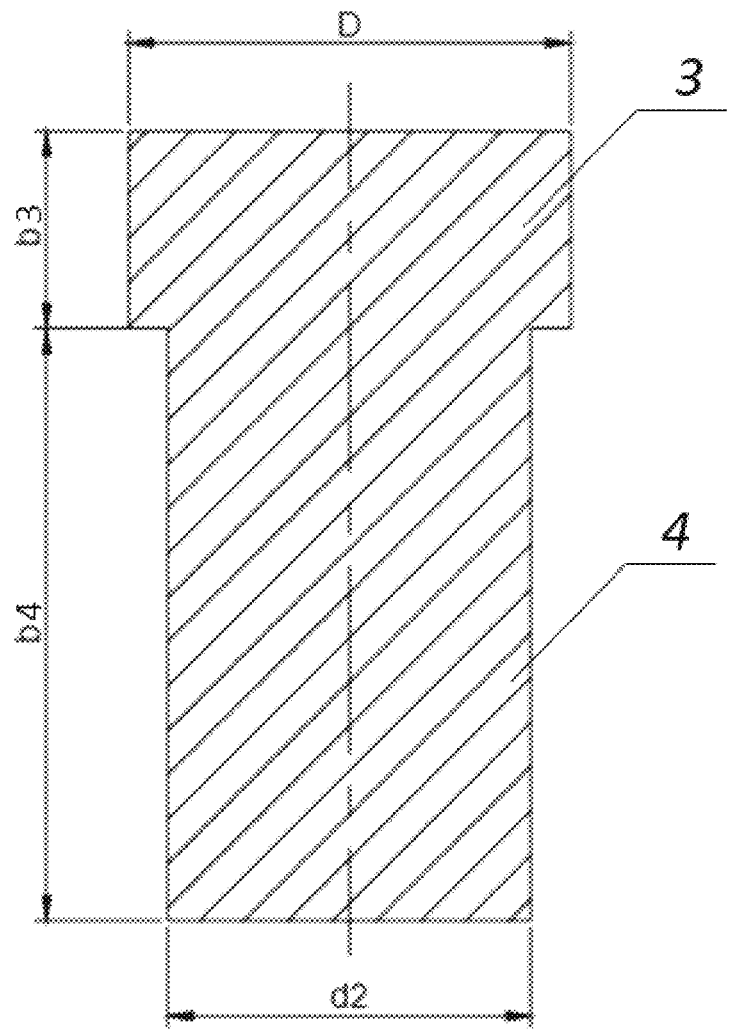
FIG. 2 shows a longitudinal sectional view of the structure of the end plug according to the second variant, where: 3—the first part of the end plug; 4—the second part of the end plug.
Figure 5:
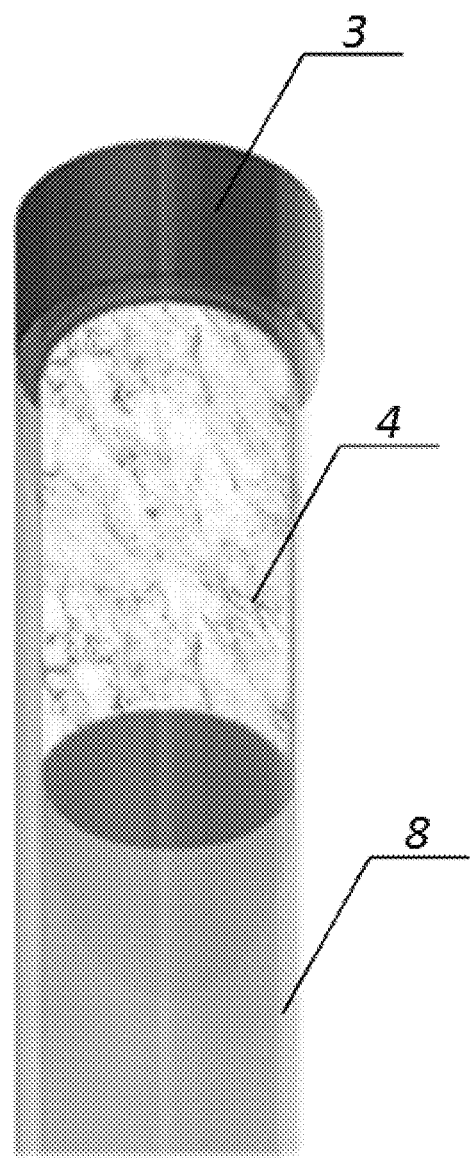
FIG. 5 shows a general perspective view of the tube of the fuel element with the end plug according to the second variant, where: 3—the first part of the end plug; 4—the second part of the end plug; 8—the fuel element cladding.

Example 3—An End Plug for Sealing a Composite Tubular Ceramic Cladding of a Fuel Element of a Nuclear Reactor According to the Second Variant The end plug intended for being bonded with the fuel element cladding 8 is produced on the basis of β-SiC and is composed of two parts in the form of two coaxial cylinders having different diameters—a first part 3 and a second part 4; see FIGS. 2 and 5. For illustrative purposes, the fuel element cladding in FIG. 5 is conventionally represented transparent.

The second part 4 of the end plug is configured to be arranged inside the fuel element cladding 8; the first part 3, i.e. a collar in the form of a cylinder having a greater diameter—tail portion, is configured to be arranged outside the fuel element cladding 8.

The inner diameter of the fuel element cladding 8 is 7.72 mm, the outer diameter is 9.1 mm. The height of the second part 4 of the end plug in the bonding area is b4=15 mm, the length of the first part 3 of the end plug is b3=5 mm. The diameter d2 of the second part 4 of the end plug is made 2 mm less than the inner diameter of the fuel element cladding 8 for the purpose of interposing a braze in the form of a foil and is equal to 5.72 mm, and the diameter D of the first part 3 of the end plug is equal to the outer diameter of the fuel element cladding—9.1 mm.

The diameter d2 of the second part 4 of the end plug, that is less than the inner diameter of the fuel element cladding by 2 mm, is determined by a thickness of the foil braze which should be placed before assembling for brazing.

The foil braze is placed before assembling for brazing, this capillary clearance is required for brazing the end plug and the cladding based on silicon carbide. FIG. 5 shows a general view of the fuel element cladding 8 with the end plug composed of the first part 3 and the second part 4, the surface of the second part 4 of the end plug being the place for interposing the foil braze.

This type of the end plug is manufactured in a size suitable for use in a WWPR reactor.

Example 4—An End Plug for Sealing a Composite Tubular Ceramic Cladding of a Fuel Element of a Nuclear Reactor According to the Second Variant The end plug intended for being bonded with the fuel element cladding 8 is produced on the basis of β-SiC and is composed of two parts in the form of two coaxial cylinders having different diameters—a first part 3 and a second part 4; see FIGS. 2 and 5. For illustrative purposes, the fuel element cladding in FIG. 5 is conventionally represented transparent.

The second part 4 of the end plug is configured to be arranged inside the fuel element cladding 8; the first part 3, i.e. a collar in the form of a cylinder having a greater diameter—tail portion, is configured to be arranged outside the fuel element cladding 8.

The inner diameter of the fuel element cladding 8 is 9.31 mm, the outer diameter is 10.75 mm. The height of the second part 4 of the end plug in the bonding area is b4=12 mm, the length of the first part 3 of the end plug is b3=6 mm. The diameter d2 of the second part 4 of the end plug is made 3 mm less than the inner diameter of the fuel element cladding 8 for the purpose of interposing a braze in the form of a foil and is equal to 6.31 mm, and the diameter D of the first part 3 of the end plug is equal to the outer diameter of the fuel element cladding—10.75 mm.

The diameter d2 of the second part 4 of the end plug, that is less than the inner diameter of the fuel element cladding by 3 mm, is determined by a thickness of the foil braze which should be placed before assembling for brazing.

The foil braze is placed before assembling for brazing, this capillary clearance is required for brazing the end plug and the cladding based on silicon carbide. FIG. 5 shows a general view of the fuel element cladding 8 with the end plug composed of the first part 3 and the second part 4, the surface of the second part 4 of the end plug being the place for interposing the foil braze.

This type of the end plug is manufactured in a size suitable for use in a PWR reactor.

Figure 3:
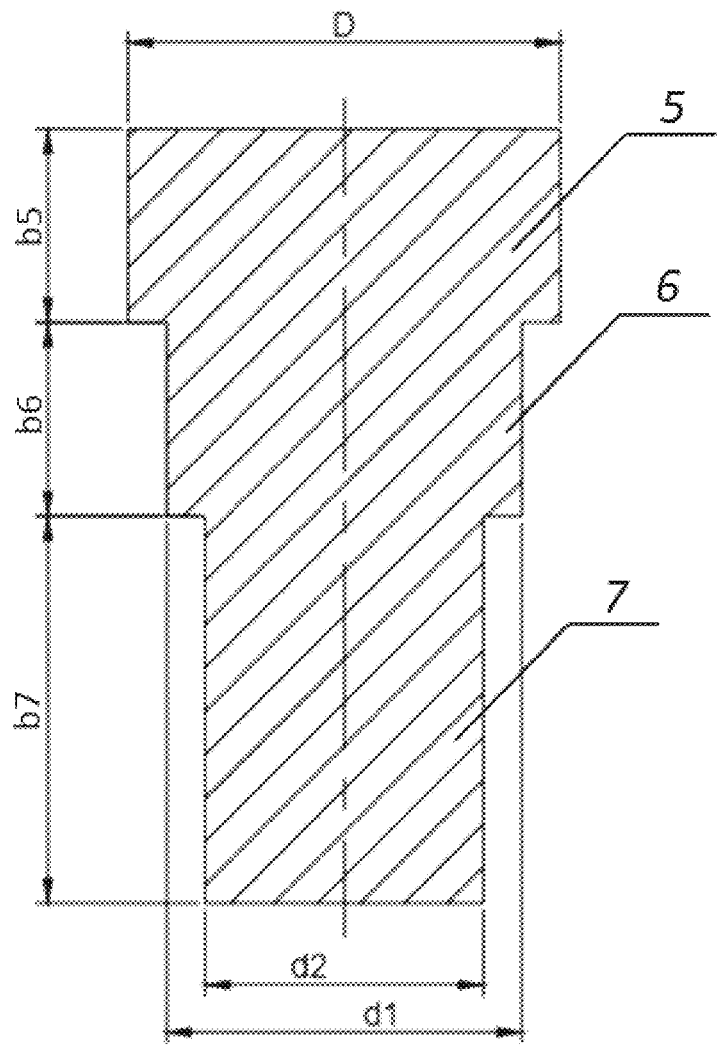
FIG. 3 shows a longitudinal sectional view of the structure of the end plug according to the third variant, where: 5—the first part of the end plug; 6—the second part of the end plug; 7—the third part of the end plug.
Figure 6:
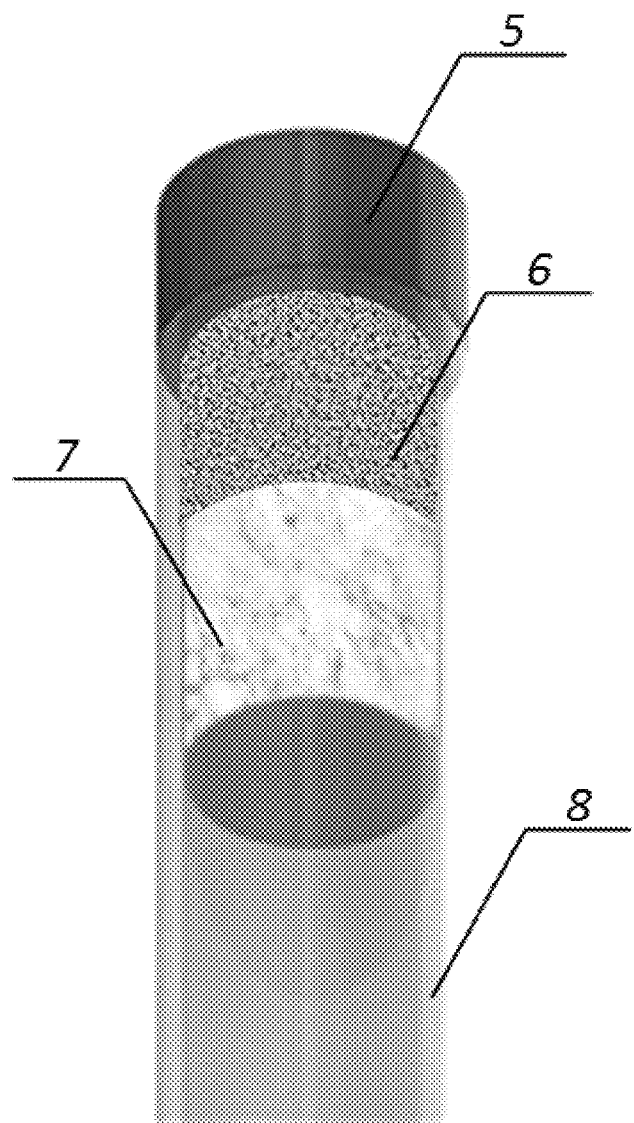
FIG. 6 shows a general perspective view of the tube of the fuel element with the end plug according to the third variant, where: 5—the first part of the end plug; 6—the second part of the end plug; 7—the third part of the end plug; 8—the fuel element cladding.

Example 5—An End Plug for Sealing a Composite Tubular Ceramic Cladding of a Fuel Element of a Nuclear Reactor According to the Third Variant The end plug intended for being bonded with the fuel element cladding 8 is produced on the basis of β-SiC and is composed of three parts in the form of three coaxial cylinders having different diameters—a first part 5, a second part 6 and a third part 7 in the form of a groove; see FIGS. 3 and 6. For illustrative purposes, the fuel element cladding in FIG. 6 is conventionally represented transparent.

The second part 6 and the third part 7 of the end plug are configured to be arranged inside the fuel element cladding 8; the first part 5, i.e. a collar in the form of a cylinder having a greater diameter—tail portion, is configured to be arranged outside the fuel element cladding 8.

The inner diameter of the fuel element cladding 8 is 7.72 mm, the outer diameter is 9.1 mm. The height of the second part 6 of the end plug in the bonding area is b6=10 mm, the length of the third part 7 of the end plug is b7=10 mm, the length of the first part 5 of the end plug is b5=3 mm.

The diameter d1 of the second part 6 is 0.06 mm less than the inner diameter of the fuel element cladding for the purpose of interposing a braze in the form of a paste and is equal to 7.66 mm, the diameter d2 of the third part 7 is 2 mm less than the inner diameter of the cladding inner diameter for the purpose of interposing a braze in the form of a foil and is equal to 5.72 mm, and the diameter of the first part 5 is equal to the outer diameter of the fuel element cladding.

This embodiment of the end plug has two zones for interposing brazes of two types simultaneously: a zone with the d1 diameter and the b6 length, and a zone with the d2 diameter and the b7 length. The diameter d2<d1, since in the end plug zone with the d1 diameter and the b6 length a braze in the form of a paste is interposed, and in the end plug zone with the d2 diameter and the b7 length a braze in the form of a foil is interposed.

FIG. 6 shows a general view of the fuel element cladding 8 with the end plug composed of the first part 5, second part 6 and third part 7, the surface of the second part 6 of the end plug is the place for interposing a braze in the form of a paste, and the surface of the third part 7 of the end plug is the place for interposing a braze in the form of a foil.

This type of the end plug is manufactured in a size suitable for use in a WWPR reactor.

Example 6—An End Plug for Sealing a Composite Tubular Ceramic Cladding of a Fuel Element of a Nuclear Reactor According to the Third Variant The end plug intended for being bonded with the fuel element cladding 8 is produced on the basis of β-SiC and is composed of three parts in the form of three coaxial cylinders having different diameters that are arranged in succession—a first part 5, a second part 6 and a third part 7 in the form of a groove; see FIGS. 3 and 6. For illustrative purposes, the fuel element cladding in FIG. 6 is conventionally represented transparent.

The second part 6 and the third part 7 of the end plug are configured to be arranged inside the fuel element cladding 8; the first part 5, i.e. a collar in the form of a cylinder having a greater diameter—tail portion, is configured to be arranged outside the fuel element cladding 8.

The inner diameter of the fuel element cladding 8 is 9.31 mm, the outer diameter is 10.75 mm. The height of the second part 6 of the end plug is b6=7 mm, the length of the third part 7 of the end plug is b7=7 mm, the length of the first part 5 of the end plug is b5=4 mm.

The diameter d1 of the second part 6 is 0.08 mm less than the inner diameter of the fuel element cladding for the purpose of interposing a braze in the form of a paste and is equal to 9.23 mm, the diameter d2 of the third part 7 is 3 mm less than the inner diameter of the cladding inner diameter for the purpose of interposing a braze in the form of a foil and is equal to 6.31 mm, and the diameter of the first part 5 is equal to the outer diameter of the fuel element cladding and is 10.75 mm.

This embodiment of the end plug has two zones for interposing brazes of two types simultaneously: a zone with the d1 diameter and the b6 length, and a zone with the d2 diameter and the b7 length. The diameter d2<d1, since in the end plug zone with the d1 diameter and the b6 length a braze in the form of a paste is interposed, and in the end plug zone with the d2 diameter and the b7 length a braze in the form of a foil is interposed.

FIG. 6 shows a general view of the fuel element cladding 8 with the end plug composed of the first part 5, second part 6 and third part 7, the surface of the second part 6 of the end plug is the place for interposing a braze in the form of a paste, and the surface of the third part 7 of the end plug is the place for interposing a braze in the form of a foil.

This type of the end plug is manufactured in a size suitable for use in a PWR reactor.

Example 7—A Method for Manufacturing an End Plug for Sealing a Composite Tubular Ceramic Cladding of a Fuel Element of a Nuclear Reactor According to the First Variant β-SiC powder was comminuted to particle sizes of 0.95 and 5.19 microns, $Al_2O_3$ powder with particles of 1.52 microns and $Y_2O_3$ powder with particles of 1.01 microns were added.

A powder mixture was prepared from the β-SiC powder, the $Al_2O_3$ powder and the $Y_2O_3$ powder. The content of the substances was, wt %: β-SiC with particles of 0.95 microns—10.59, β-SiC with particles of 5.19 microns—77.91, $Al_2O_3$ with particles of 1.52 microns—10.0, $Y_2O_3$ with particles of 1.01 microns—1.5.

Figure 11:
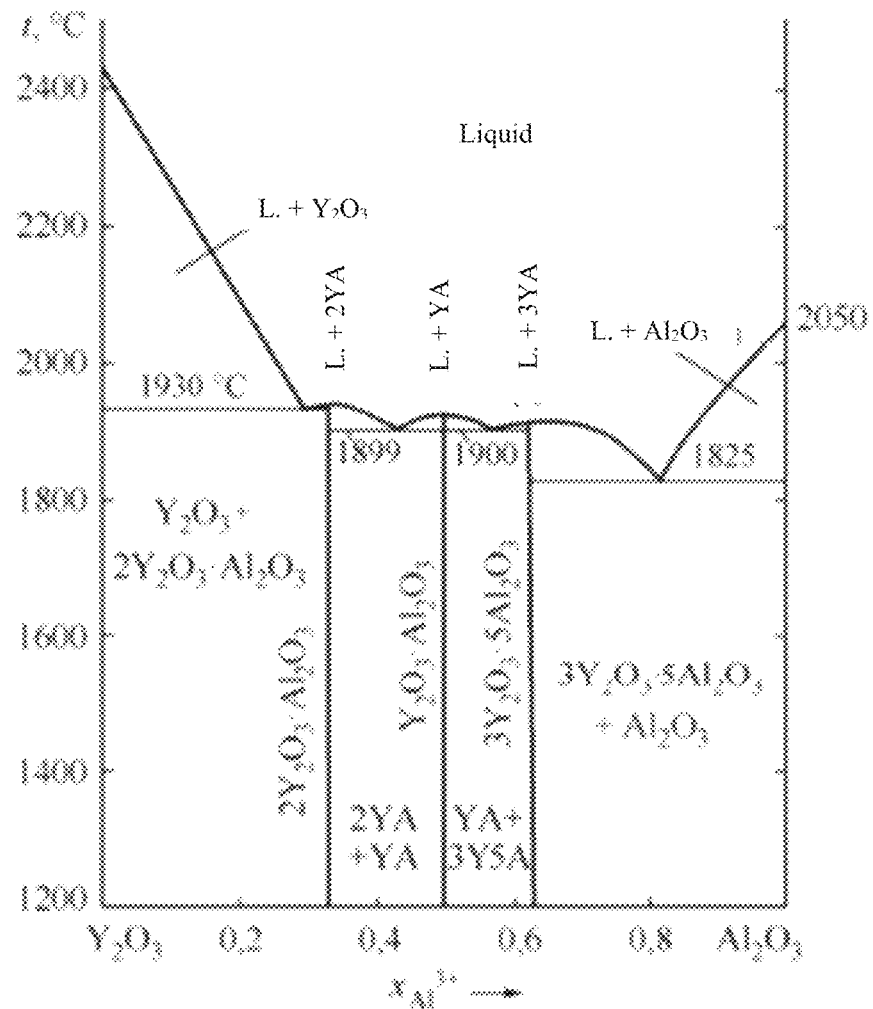
FIG. 11 shows a schematic view status diagram of the $Al_2O_3$—$Y_2O_3$ system.

The composition of the above powder mixture was preselected on the basis of an $Al_2O_3$—$Y_2O_3$ system state diagram, see FIG. 11.

After the powder mixture was prepared, a planetary ball mill was used for mixing them uniformly.

Figure 7:
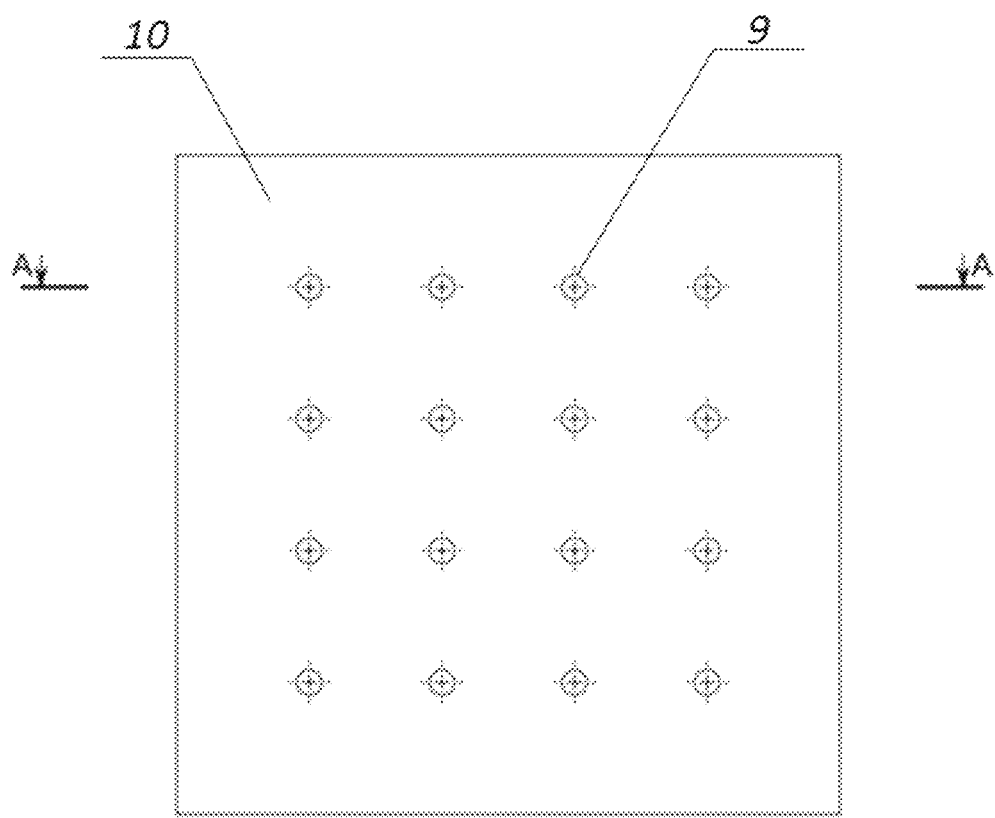
FIG. 7 shows a schematic view drawing of a mold for pressing the plugs according to the 1st, 2nd and 3rd variants, top view, where: 9—cells, 10—mold.
Figure 8:
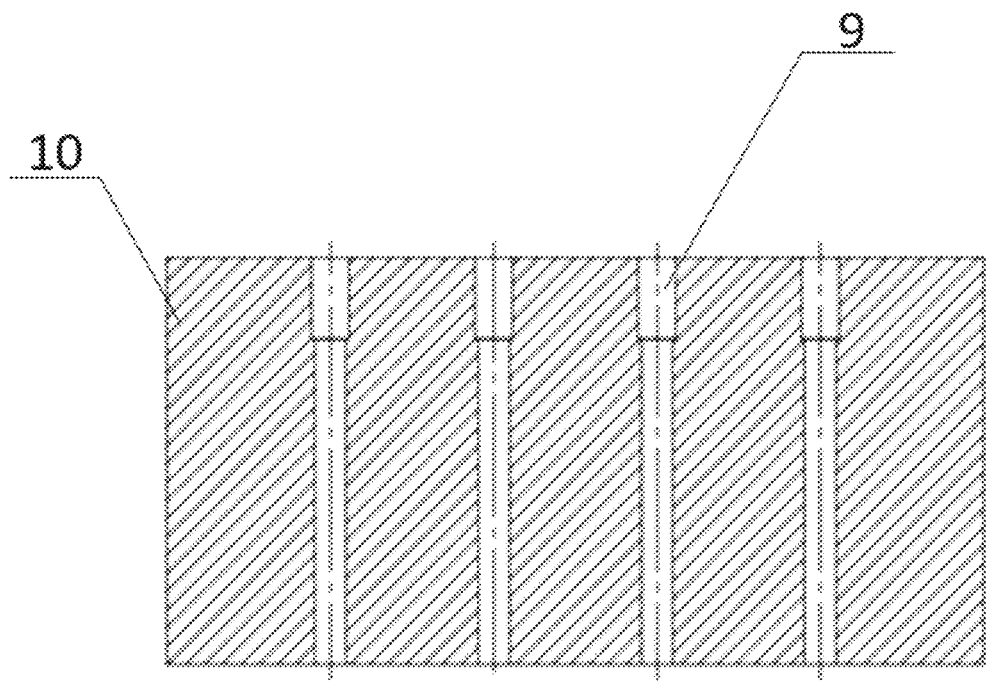
FIG. 8 shows a schematic view drawing of a mold for pressing the plugs according to the 1st and 2nd variants, A-A section, where: 9—cells, 10—mold.
Figure 10:
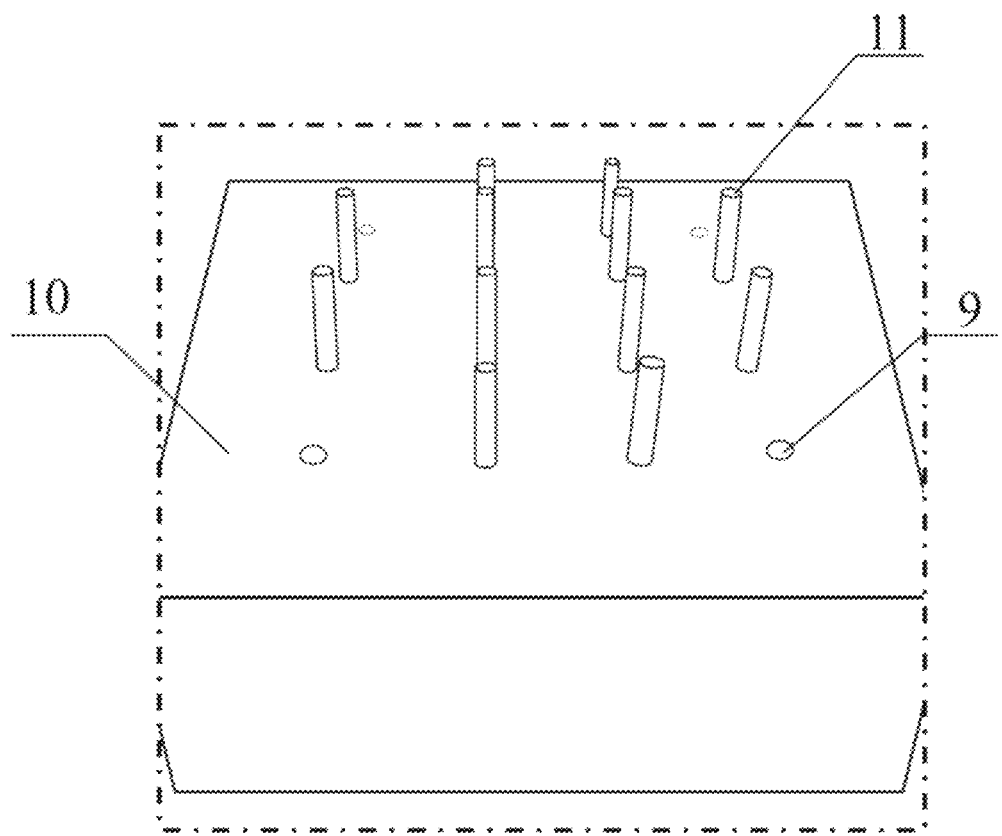
FIG. 10 shows an external perspective view of a mold with cells and upper punches, where: 9—cells, 10—mold, 11—upper punches.

In order to manufacture an end plug by the hot pressing technique, a strength calculation was performed for a mold and punches with the use of the finite element method and the Solidworks Simulation™ software; as a result, the PUS-1 graphite was selected, models were developed, and a mold 10 was manufactured in the form of a parallelepiped with 12 equal through cylindrical cells 9 of the required shape, and upper punches 11 of cylindrical shape were manufactured; see FIGS. 7, 8, 10.

The shape of the mold cells 9 corresponded to the end plug according to the first variant disclosed in Example 1, namely, the diameter D of the upper cylindrical portion of the cells was 9.1 mm, the height b1 of this portion was 7 mm. The diameter d1 of the lower cylindrical portion of the cells was 7.66 mm, i.e. 0.06 mm less than the cladding inner diameter, the height b2 of this portion was 10 mm. The upper punches 11 were made with due regard to these dimensions. FIG. 7 shows a drawing of the mold 10 with the cells 9 for pressing plugs, a top view; FIG. 8 shows a drawing of the mold 10 with the cells 9 for pressing plugs, A-A section.

Immediately before hot pressing, the mold and the punches were annealed in a vacuum compression furnace for the purpose of removing moisture and various kinds of dirt from the surface. To do this, the mold and the punches were heated in the furnace to the temperature of 200 degrees C., annealed for 60 minutes, cooled to the room temperature at a rate not more than 50 degrees C. per hour, and held at the room temperature for at least 12 hours, the pressure in the furnace chamber being maintained at a level not higher than 1 Pa during the whole process.

Upon cooling and unloading from the furnace, the mold 10 was prepared for pressing as follows:
lower punches were arranged in the lower portion of each mold cell 9 (not shown in the drawings);
then, a powder mixture was put into each of the 12 mold cells in the quantity of 2.5±0.002 g onto the lower punches;
after that, the upper punches 11 were arranged over the powder mixture so that they covered each cell 9 in the upper part of the mold 10.

Figure 12:
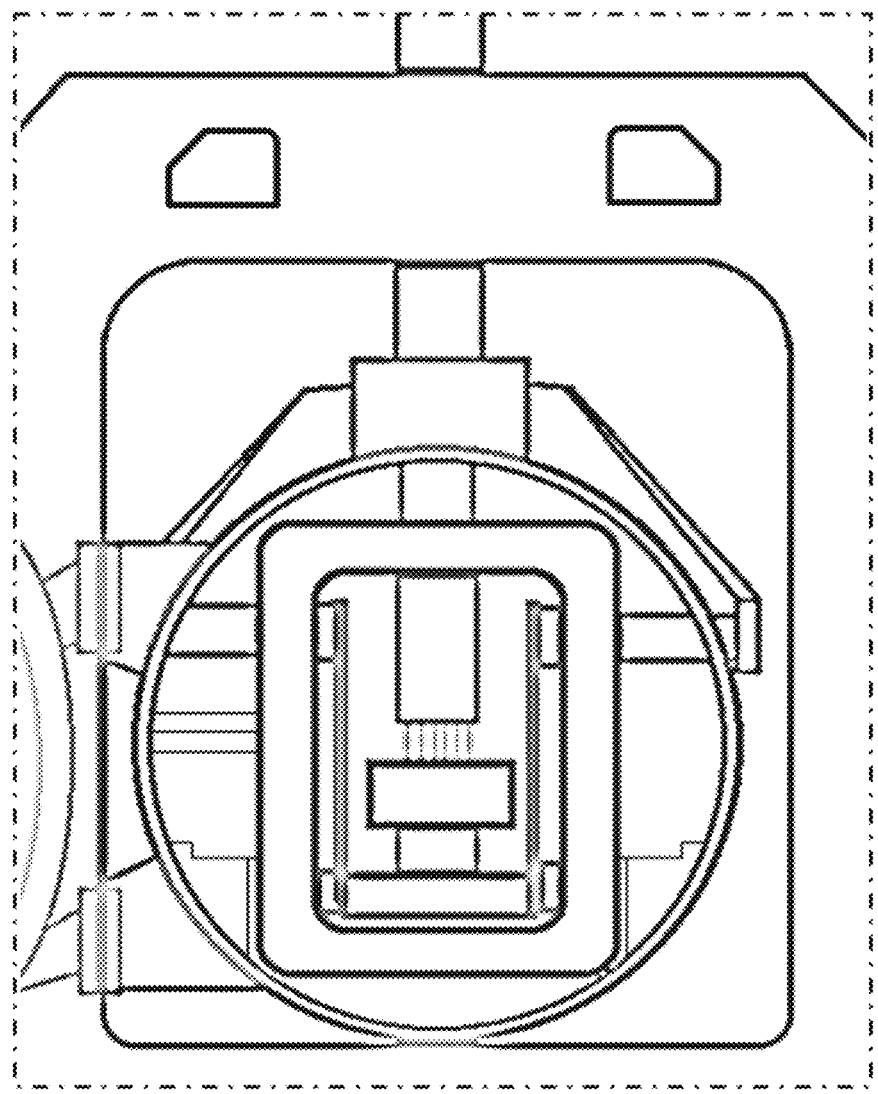
FIG. 12 shows a photo illustration of samples arranged in a furnace.

The prepared mold 10 with the powder mixture was placed into the furnace and held without heating at the pressure of ~1 Pa for more than 12 hours. Ceramic plugs were sintered in the inert gas (argon) atmosphere at the temperature of 1850 degrees C. and the pressure of app. 0.1 MPa. The mode of sintering the end plugs is shown in Table 3. The arrangement of the samples in the furnace is shown in FIG. 12.

TABLE 4

Mode of sintering end plugs in the furnace.

| Stage | Description of sintering stage | Composition acc. to the first variant |
|---|---|---|
| 1 | Supply of Ar inert gas into the furnace and pressure generation in the furnace chamber, MPa | 0.1 |
| 2 | Application of pressing force per 1 end plug, MPa | 22-25 |
| 3 | Heating of the furnace to the sintering temperature for the time period, minutes | 180 |
| 4 | Sintering temperature, ° C. | 1850 |
| 5 | Time of holding at the sintering temperature, minutes | 120 |
| 6 | Switching off heating of the furnace and cooling to the temperature of, ° C. | 100 |
| 7 | Removal of the pressing force when the furnace temperature is, ° C. | 100 |

After sintering, the samples of end plugs were ejected from the mold and cleaned up.

The produced samples of the end plugs were forwarded for studying their mechanical and thermophysical properties. The study results showed that the produced end plugs had high mechanical characteristics and good thermophysical properties that allow using them under the required conditions.

Example 8—A Method for Manufacturing an End Plug for Sealing a Composite Tubular Ceramic Cladding of a Fuel Element of a Nuclear Reactor According to the First Variant The method was carried out similarly to that described in Example 7, but with the use of other dimensions of the mold cells and the upper punches that correspond to the end plugs according to the second embodiment disclosed in Example 3.

Namely, the diameter D of the upper cylindrical portion of the cells is 9.1 mm, the height b3 of this portion is 5 mm. The diameter d2 of the lower cylindrical portion of the cells is 5.72 mm, i.e. 2 mm less than the inner diameter of the cladding, the height b4 of this portion is 15 mm. The upper punches 11 are made with due regard to these dimensions. FIG. 7 shows a drawing of the mold 10 with the cells 9 for pressing plugs, a top view; FIG. 8 shows a drawing of the mold 10 with the cells 9 for pressing plugs, A-A Section.

The study results showed that the produced end plugs had high mechanical characteristics and good thermophysical properties that allow using them under the required conditions.

Example 9—A Method for Manufacturing an End Plug for Sealing a Composite Tubular Ceramic Cladding of a Fuel Element of a Nuclear Reactor According to the First Variant The method was carried out similarly to that described in Example 7, but with the use of other dimensions of the mold cells and the upper punches that correspond to the end plugs according to the third embodiment disclosed in Example 5. Further, the produced powder mixture was hot pressed in a vacuum furnace, rather than in the inert gas atmosphere.

Figure 9:
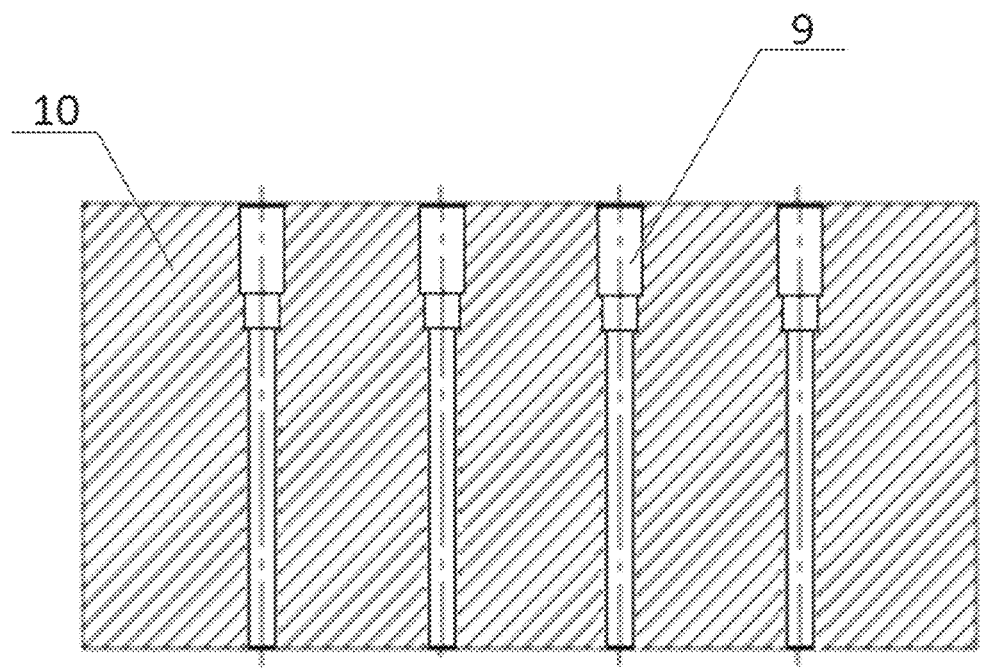
FIG. 9 shows a schematic view drawing of a mold for pressing the plugs according to the 3rd variant, A-A section, where: 9—cells, 10—mold.

The diameter D of the upper cylindrical portion of the cells is 9.1 mm, the height b3 of this portion is 5 mm. The diameter d1 of the middle cylindrical portion of the cells is 7.66 mm, i.e. 0.06 mm less than the inner diameter of the cladding, the height b6 of this portion is 10 mm. The diameter d2 of the lower cylindrical portion of the cells is 5.72 mm, i.e. 2 mm less than the inner diameter of the cladding, the height b7 of this portion is 10 mm. The upper punches 11 are made with due regard to these dimensions. FIG. 7 shows a drawing of the mold 10 with the cells 9 for pressing plugs, a top view; FIG. 9 shows a drawing of the mold 10 with the cells 9 for pressing plugs, A-A Section.

The study results showed that the produced end plugs had high mechanical characteristics and good thermophysical properties that allow using them under the required conditions.

Example 10—A Method for Manufacturing an End Plug for Sealing a Composite Tubular Ceramic Cladding of a Fuel Element of a Nuclear Reactor According to the Second Variant β-SiC powder was comminuted to particle sizes of 0.95 and 5.19 microns, $Al_2O_3$ powder with particles of 1.52 microns and $Y_2O_3$ powder with particles of 1.01 microns were added.

A powder mixture was prepared from the β-SiC powder, the $Al_2O_3$ powder and the $Y_2O_3$ powder. The substance content was, wt %: β-SiC with particles of 0.95 microns—10.78, β-SiC with particles of 5.19 microns—79.22, $Al_2O_3$ with particles of 1.52 microns—6.00, $Y_2O_3$ with particles of 1.01 microns—4.00.

The composition of the above powder mixture was preselected on the basis of an $Al_2O_3$—$Y_2O_3$ system state diagram, see FIG. 11.

After the powder mixture was prepared, a planetary ball mill was used for mixing them uniformly.

In order to manufacture an end plug by the hot pressing technique, a strength calculation was performed for a mold and punches with the use of the finite element method and the Solidworks Simulation™ software; as a result, the PUS-1 graphite was selected, models were developed, and a mold 10 was manufactured in the form of a parallelepiped with 12 equal through cylindrical cells 9 of the required shape, and upper punches 11 of cylindrical shape were manufactured; see FIGS. 7, 8, 10.

The shape of the mold cells 9 corresponded to the end plug according to the first variant disclosed in Example 1, namely, the diameter D of the upper cylindrical portion of the cells was 9.1 mm, the height b1 of this portion was 7 mm. The diameter d1 of the lower cylindrical portion of the cells was 7.66 mm, i.e. 0.06 mm less than the cladding inner diameter, the height b2 of this portion was 10 mm. The upper punches 11 were made with due regard to these dimensions. FIG. 7 shows a drawing of the mold 10 with the cells 9 for pressing plugs, a top view; FIG. 8 shows a drawing of the mold 10 with the cells 9 for pressing plugs, A-A section.

Immediately before hot pressing, the mold and the punches were annealed in a vacuum compression furnace for the purpose of removing moisture and various kinds of dirt from the surface. To do this, the mold and the punches were heated in the furnace to the temperature of 200 degrees C., annealed for 60 minutes, cooled to room temperature at a rate not more than 50 degrees C. per hour, and held at room temperature for at least 12 hours, the pressure in the furnace chamber being maintained at a level not higher than 1 Pa during the whole process.

Upon cooling and unloading from the furnace, the mold 10 was prepared for pressing as follows:
  lower punches were arranged in the lower portion of each mold cell 9 (not shown in the drawings);
  then, a powder mixture was put into each of the 12 mold cells in the quantity of 2.5±0.002 g onto the lower punches;
  after that, the upper punches 11 were arranged over the powder mixture so that they covered each cell 9 in the upper part of the mold 10.

The prepared mold 10 with the powder mixture was placed into the furnace and held without heating at the pressure of ~1 Pa for more than 12 hours. Ceramic plugs were sintered in the inert gas (argon) atmosphere at the temperature of 1850 degrees C. and the pressure of app. 0.1 MPa. The modes of sintering the end plugs are shown in Table 5. The arrangement of the samples in the furnace is shown in FIG. 12.

TABLE 5

Mode of sintering end plugs in furnace.

| Stage | Sintering stage description | Composition acc. to the second variant |
|---|---|---|
| 1 | Supply of Ar inert gas into the furnace and pressure generation in the furnace chamber, MPa | 0.1 |
| 2 | Application of pressing force per 1 end plug, MPa | 22-25 |
| 3 | Heating of the furnace to the sintering temperature for the time period, minutes | 180 |
| 4 | Sintering temperature, ° C. | 1850 |
| 5 | Time of holding at the sintering temperature, minutes | 90 |
| 6 | Switching off heating of the furnace and cooling to the temperature of, ° C. | 100 |
| 7 | Removal of the pressing force when the furnace temperature is, ° C. | 100 |

After sintering, the samples of the end plugs were ejected from the mold and cleaned up.

The produced samples of the end plugs were forwarded for studying their mechanical and thermophysical properties. The study results showed that the produced end plugs had high mechanical characteristics and good thermophysical properties that allow using them under the required conditions.

Example 11—A Method for Manufacturing an End Plug for Sealing a Composite Tubular Ceramic Cladding of a Fuel Element of a Nuclear Reactor According to the Second Variant The method was carried out similarly to that described in Example 10, but with the use of other dimensions of the mold cells and the upper punches that correspond to the end plugs according to the second embodiment disclosed in Example 3. Further, the produced powder mixture was hot pressed in a vacuum furnace, rather than in the inert gas atmosphere.

The diameter D of the upper cylindrical portion of the cells is 9.1 mm, the height b3 of this portion is 5 mm. The diameter d2 of the lower cylindrical portion of the cells is 5.72 mm, i.e. 2 mm less than the cladding inner diameter, the height b4 of this portion is 15 mm. The upper punches 11 are made with due regard to these dimensions. FIG. 7 shows a drawing of the mold 10 with the cells 9 for pressing plugs, a top view; FIG. 8 shows a drawing of the mold 10 with the cells 9 for pressing plugs, A-A Section.

The study results showed that the produced end plugs had high mechanical characteristics and good thermophysical properties that allow using them in the required conditions.

Example 12—A Method for Manufacturing an End Plug for Sealing a Composite Tubular Ceramic Cladding of a Fuel Element of a Nuclear Reactor According to the Second Variant The method was carried out similarly to that described in Example 10, but with the use of other dimensions of the mold cells and the upper punches that correspond to the end plugs according to the third embodiment disclosed in Example 5.

The diameter D of the upper cylindrical portion of the cells is 9.1 mm, the height b5 of this portion is 3 mm. The diameter d1 of the middle cylindrical portion of the cells is 7.66 mm, i.e. 0.06 mm less than the cladding inner diameter, the height b6 of this portion is 10 mm. The diameter d2 of the lower cylindrical portion of the cells is 5.72 mm, i.e. 2 mm less than the cladding inner diameter, the height b7 of this portion is 10 mm. The upper punches 11 are made with due regard to these dimensions. FIG. 7 shows a drawing of the mold 10 with the cells 9 for pressing plugs, a top view; FIG. 9 shows a drawing of the mold 10 with the cells 9 for pressing plugs, A-A Section.

The study results showed that the produced end plugs had high mechanical characteristics and good thermophysical properties that allow using them in the required conditions.

Thus, the developed structure of the end plug and the method for manufacturing it enables to seal fuel elements made of silicon carbide, including cases where pressure of an inert gas exists in the fuel element inner volume. The invention provides:
  safety for the environment due to preventing ecologically hazardous compounds from forming,
  possibility of using the developed end plugs as an alternative for replacing plugs used in various WWPR reactors due to their shape and dimensions suitable for typical structures,
  a simplified method for manufacturing end plugs due to a fewer number of the manufacturing stages,
  improved mechanical and thermophysical properties of end plugs due to the developed method for manufacturing end plugs wherein particle sizes of the substances used and parameters of the procedures performed are taken into account.

We claim:

1. A method for manufacturing an end plug for sealing a composite tubular ceramic cladding of a fuel element of a nuclear reactor, comprising the steps of:
  preparing a powder mixture from β-SiC powder, $Al_2O_3$ powder and $Y_2O_3$ powder, which are taken in the following quantities, wt %:
  β-SiC with particles of 0.95 microns—10.59,
  β-SiC with particles of 5.19 microns—77.91,
  $Al_2O_3$ with particles of 1.52 microns—10.0,
  $Y_2O_3$ with particles of 1.01 microns—the rest;
  hot pressing of the powder mixture with the use of upper and lower punches and a mold with mold cells,
  wherein each mold cell has a shape and dimensions corresponding to an end plug having a first part and a second part,
  wherein the first and second parts are coaxial cylinders having different diameters,
  wherein the step of hot pressing comprises the steps of:
  arranging the lower punches into inner cavities of the mold cells,
  loading the powder mixture into the inner cavities and onto the lower punches,
  putting the upper punches into the mold cells over the powder mixture,
  holding the powder mixture without heating at the pressure of 1 Pa for more than 12 hours,
  pressing the powder mixture in the mold cells with the use of the upper punches,
  sintering at the temperature of 1850 degrees C. in an inert gas atmosphere or in vacuum at the pressure of 0.1 MPa, and
  having the holding duration in the sintering mode be 120 minutes; and
  ejecting finished end plugs from the mold cells.

2. The method for manufacturing, according to claim 1, wherein the step of preparing the powder mixture is comprised of mixing the powder mixture uniformly with a planetary ball mill.

3. The method for manufacturing, according to claim 1, further comprising the step of: annealing the mold and the punches in a vacuum compression furnace before the step of hot pressing.

4. The method for manufacturing, according to claim 3, wherein the step of annealing is comprised of: heating the mold and the punches in a vacuum compression furnace to the temperature of 200° C., annealing for 60 minutes, cooling to the room temperature at a rate not more than 50° C. per hour, and holding at the room temperature for at least 12 hours, while maintaining pressure in a chamber of the vacuum compression furnace at a level not higher than 1 Pa.

5. A method for manufacturing an end plug for sealing a composite tubular ceramic cladding of a fuel element of a nuclear reactor, comprising the steps of:
  preparing a powder mixture from β-SiC powder, $Al_2O_3$ powder and $Y_2O_3$ powder, which are taken in the following quantities, wt %:
  β-SiC with particles of 0.95 microns—10.78,
  β-SiC with particles of 5.19 microns—79.22,
  $Al_2O_3$ with particles of 1.52 microns—6.0,
  $Y_2O_3$ with particles of 1.01 microns—the rest;
  hot pressing of the powder mixture with the use of upper and lower punches and a mold with mold cells,
  wherein each mold cell has a shape and dimensions corresponding to an end plug having a first part and a second part,
  wherein the first and second parts are coaxial cylinders having different diameters,
  wherein the step of hot pressing comprises the steps of:
  arranging the lower punches into inner cavities of the mold cells,
  loading the powder mixture into the inner cavities and onto the lower punches,
  putting the upper punches into the mold cells over the powder mixture,
  holding the powder mixture without heating at the pressure of 1 Pa for more than 12 hours,
  pressing the powder mixture in the mold cells with the use of the upper punches,
  sintering at the temperature of 1850 degrees C. in an inert gas atmosphere or in vacuum at the pressure of 0.1 MPa, and
  having a holding duration in the sintering mode be 90 minutes; and
  ejecting finished end plugs from each mold cell.

6. The method for manufacturing, according to claim 5, wherein the step of preparing the powder mixture, is comprised of mixing the powder mixture uniformly with a planetary ball mill.

7. The method for manufacturing, according to claim 5, further comprising the step of: annealing the mold and the punches in a vacuum compression furnace before the step of hot pressing.

8. The method for manufacturing, according to claim 7, wherein the step of annealing is comprised of: heating the mold and the punches in a vacuum compression furnace to the temperature of 200° C., annealing for 60 minutes, cooling to the room temperature at a rate not more than 50° C. per hour, and holding at the room temperature for at least 12 hours, while maintaining pressure in a chamber of the vacuum compression furnace at a level not higher than 1 Pa.

* * * * *